United States Patent
Ichino

(10) Patent No.: US 8,626,688 B2
(45) Date of Patent: Jan. 7, 2014

(54) PATTERN MATCHING DEVICE AND METHOD USING NON-DETERMINISTIC FINITE AUTOMATON

(75) Inventor: Kiyohisa Ichino, Tokyo (JP)

(73) Assignee: NEC Corporation, Tokyo (JP)

( * ) Notice: Subject to any disclaimer, the term of this patent is extended or adjusted under 35 U.S.C. 154(b) by 527 days.

(21) Appl. No.: 12/522,828

(22) PCT Filed: Nov. 6, 2007

(86) PCT No.: PCT/JP2007/071526
§ 371 (c)(1),
(2), (4) Date: Jul. 10, 2009

(87) PCT Pub. No.: WO2008/084594
PCT Pub. Date: Jul. 17, 2008

(65) Prior Publication Data
US 2010/0049713 A1    Feb. 25, 2010

(30) Foreign Application Priority Data
Jan. 12, 2007 (JP) ................................ 2007-004458

(51) Int. Cl.
| G06F 17/00 | (2006.01) |
| G06F 13/00 | (2006.01) |
| G06F 13/28 | (2006.01) |
| G06F 17/30 | (2006.01) |
| G06N 5/00 | (2006.01) |

(52) U.S. Cl.
USPC ........................................... 706/45; 711/108

(58) Field of Classification Search
None
See application file for complete search history.

(56) References Cited

U.S. PATENT DOCUMENTS

| 6,990,552 | B2 * | 1/2006 | Abdat ........................... 711/108 |
| 7,260,558 | B1 * | 8/2007 | Cheng et al. ..................... 706/12 |
| 7,305,391 | B2 * | 12/2007 | Wyschogrod et al. ................. 1/1 |
| 7,502,769 | B2 * | 3/2009 | Nugent ........................... 706/26 |
| 7,975,305 | B2 * | 7/2011 | Rubin et al. ..................... 726/25 |

FOREIGN PATENT DOCUMENTS

| JP | 1991119397 A | 5/1991 |
| JP | 2921119 B | 4/1999 |
| JP | 2003308333 A | 10/2003 |
| JP | 2005122444 A | 5/2005 |

(Continued)

OTHER PUBLICATIONS

International Search Report for PCT/JP2007/071526 mailed Feb. 5, 2008.

(Continued)

*Primary Examiner* — Kakali Chaki
*Assistant Examiner* — Daniel Pellett

(57) ABSTRACT

Provided is a pattern matching device comprising memories. On each of the combinations of the values of an N number (N: a natural number) of pattern detection signals outputted from a circuited NFA (Non-deterministic Finite Automaton), the memories store both identifiers indicating patterns corresponding to effective patterns of the N number of pattern detection signals and flags indicating the definitions of the combinations, individually in addresses set according to the combinations. Further comprised are an address creating unit for determining the address of the memory corresponding to the combination of the values of the pattern detection signals, by using the combination of the values of the pattern detection signals outputted from the circuited NFA, and a read control unit for reading the identifiers and the flags stored in the address from the memories while incrementing the addresses determined by the address creating unit, until the flags take a specific value.

4 Claims, 8 Drawing Sheets

(56) References Cited

FOREIGN PATENT DOCUMENTS

| | | |
|---|---|---|
| JP | 2005242672 A | 9/2005 |
| JP | 2005242997 A | 9/2005 |
| WO | 2006061899 A | 6/2006 |

OTHER PUBLICATIONS

R. Sidhu et al., "Fast Regular Expression Matching using FPGAs", Field-Programmable Custom Computing Machines (FCCM), Rohnert Park, CA, USA, Apr. 2001.

* cited by examiner

Transition to state 0 is omitted

| First pattern | AB*C |
| Second pattern | A,[B\|C] |
| Third pattern | CAB |

| Pattern detection signal 30-1 | Pattern detection signal 30-2 | Pattern detection signal 30-3 |
|---|---|---|
| 0 | 0 | 0 |
| 0 | 1 | 0 |
| 1 | 1 | 0 |
| 1 | 0 | 0 |
| 0 | 1 | 1 |

15 Input table

Fig.11

Algorithm A102
```
index[0] ← 0
address ← 1 for i ← 1 to M−1
        index[i] ← address for j ← 0 to N−1
                if input[i][j] = 1 then
                        pattern_id[address] ← ID of (j+1)-th pattern
                        termination_flag[address] ← 0
                        address ← address+1 termination_flag[address − 1] ← 1
```

Fig.12

Truth value table 17

| Input | | | | Output |
|---|---|---|---|---|
| Pattern detection signal 30-1 | Pattern detection signal 30-2 | ......... | Pattern detection signal 30-N | Start address 31 |
| input [0][0] | input [0][1] | ......... | input [0][N-1] | index[0] |
| input [1][0] | input [1][1] | ......... | input [1][N-1] | index[1] |
| ⋮ | ⋮ | ⋱ | ⋮ | ⋮ |
| input [M-1][0] | input [M-1][1] | ......... | input [M-1][N-1] | index[M-1] |
| others | | | | Don't care |

15 Input table

16 Index

↓

(concrete example)

Truth value table 17

| Input | | | Output(Start address 31) | |
|---|---|---|---|---|
| Pattern detection signal 30-1 | Pattern detection signal 30-2 | Pattern detection signal 30-3 | Decimal notation | Binary notation |
| 0 | 0 | 0 | 0 | 000 |
| 0 | 1 | 0 | 1 | 001 |
| 1 | 1 | 0 | 2 | 010 |
| 1 | 0 | 0 | 4 | 100 |
| 0 | 1 | 1 | 5 | 101 |
| others | | | Don't care | |

Fig.13

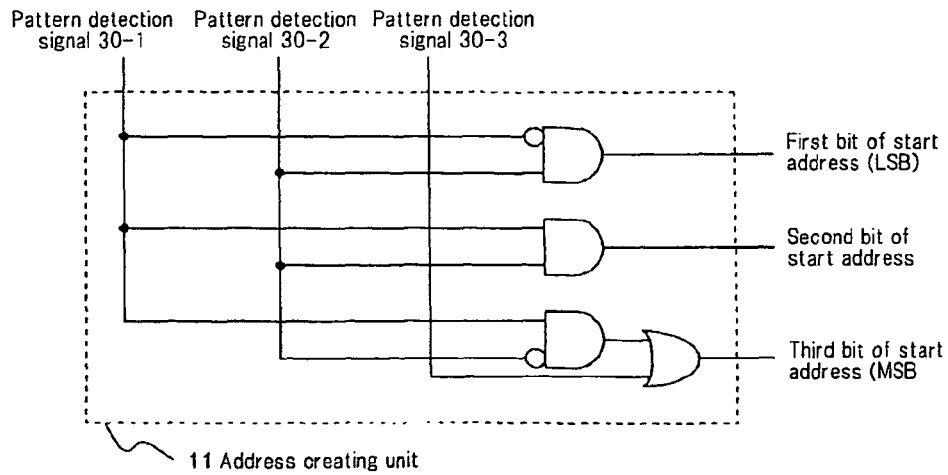

Pattern detection signal 30-1, Pattern detection signal 30-2, Pattern detection signal 30-3

First bit of start address (LSB)

Second bit of start address

Third bit of start address (MSB)

11 Address creating unit

| Text 20 | Pattern detection signal 30-1 | Pattern detection signal 30-2 | Pattern detection signal 30-3 | Start address 31 | | Address 32 | Termination flag 33 | Pattern ID 21 |
|---|---|---|---|---|---|---|---|---|
| | | | | Decimal notation | Binary notation | | | |
| A | 0 | 0 | 0 | 000 | 0 | | | |
| C | 1 | 1 | 0 | 010 | 2 | 2 | 0 | ID of first pattern |
| | | | | | | 3 | 1 | ID of second pattern |
| A | 0 | 0 | 0 | 000 | 0 | | | |
| B | 0 | 1 | 1 | 101 | 5 | 5 | 0 | ID of second pattern |
| | | | | | | 6 | 1 | ID of third pattern | chronology

PATTERN MATCHING DEVICE AND METHOD USING NON-DETERMINISTIC FINITE AUTOMATON

This application is the National Phase of PCT/JP2007/071526, filed Nov. 6, 2007, which claims priority to Japanese Patent Application No. 2007-004458, filed on Jan. 12, 2007, which is incorporated herein by reference in its entirety.

TECHNICAL FIELD

The present invention relates to a pattern matching device and method which determines whether or not a specific pattern exists in input data.

BACKGROUND ART

Pattern matching for determining whether or not a specific pattern exists in input data is an elemental technology in the field of information processing, and its applications are wide-ranging. For example, these applications include text search in a word processor, DNA analysis in biotechnology, detection of a computer virus lurking in email, and so forth.

As one means for implementing pattern matching, there is a method using a finite automaton (alias: a finite state device and a finite state machine).

A finite automaton for pattern matching is created from a pattern or a set of patterns.

As an example, an NFA (Non-deterministic Finite Automaton) and a DFA (Deterministic Finite Automaton) that accepts three types of patterns "ABC", "CAB", and "ABCD" will be described.

FIG. 1 is a view showing one example of an NFA. Also, FIG. 2 is a view showing one example of a DFA. The difference between the NFA and the DFA will be described later.

A finite automaton for pattern matching starts from an initial state, and makes a transition to the next state through a branch corresponding to an input character. When a state (shown by double circles in the drawing) corresponding to the last character is reached, it is considered that a pattern is detected.

The above operation is repeatedly performed for all the characters from the beginning to the end of a text.

There are two expression types of finite automaton: NFA and DFA.

The DFA is a finite automaton where once the current state and an input are determined, the next state is uniquely determined, as indicated by the word "deterministic". Meanwhile, the NFA is a finite automaton where the next state is not uniquely determined.

For example, when putting a focus on the NFA as shown in FIG. 1 that is in state 0, there are three states: state 0, state 1, and state 2 as transition destinations corresponding to an input character 'A'.

In a case where the NFA is operated on a sequential processing computer, when there exists a plurality of transition destinations from any given state, this state is put on a stack, and then one of the plurality of transition destinations is selected to make a state transition. Then, the NFA is tracked until there is no state transition or the end of the text is reached.

Afterwards, one of the states is extracted from the stack, a return is made to that state, and a transition destination different from the previous one is selected and a state transition is made.

The above operation is repeated until the stack becomes empty.

In the case where the NFA is operated on a sequential processing computer as described above, the behavior of turning back to a past state and restarting a state transition, that is, a backtracking is generated. Due to the effect of backtracking, the search speed based on the NFA is lower than that based on the DFA.

Meanwhile, the number of states and number of state transitions (number of branches) included in the DFA tend to be greater than those of the DFA. Therefore, the size of a memory for storing the DFA is greater than that of the NFA. Also, it is known that a large amount of computational effort is needed to create the DFA.

As discussed above, the only one downside with the NFA is a decrease in search speed caused by backtracking. Backtracking is generated by the restriction in which a plurality of transition destinations cannot be simultaneously searched in the sequential processing computer. That is, parallel processing is required to suppress backtracking.

Consequently, a method for representing an NFA by combinations of flip-flops and various gates (AND or OR), burying these combinations as a circuit in a device, such as an LSI, and performing pattern matching using the circuit is suggested in a paper titled "Fast Regular Expression Matching using FPGAs" by R. Sidhu and V. K. Prasanna, Field-Programmable Custom Computing Machines (FCCM), Rohnert Park, Calif., USA, April 2001.

By circuitizing the NFA as described above, backtracking, which is the drawback of the NFA, can be solved. This is because all the flip-flops and the gates are operable in parallel in the circuit.

FIG. 3 is a view showing one example of input patterns. Also, FIG. 4 is a view showing an NFA for accepting the patterns as shown in FIG. 3. Also, FIG. 5 is a view showing one example of a circuit diagram representing the NFA as shown in FIG. 4 by flip-flops and gates.

A regular expression is included in the three patterns "AB*C", "A[B|C]", and "CAB" as shown in FIG. 3. A regular expression is an expression that can define simple patterns.

"B*" included in the first pattern "AB*C" represents a sequence of zero or more Bs. Hence, the first pattern matches text "AC", "ABC", "ABBC", and so forth.

"[B|C]" included in the second pattern "A[B|C]" represents B or C. Hence, the second pattern matches text "AB" and "AC".

As shown in FIG. 5, an input of an NFA circuit 10 is character 22 which is an element of text 20 that is to be searched. The text 20 are sequentially given one by one to the NFA circuit 10 characters 22 starting from the leading character as characters 22.

The NFA circuit 10 sets a pattern detection signal 30-X ($1 \leq X \leq 3$) to 1 each time it detects an X-th pattern. Meanwhile, other pattern detection signals 30-1~30-3 are set to 0. Also, two or more of the pattern detection signals 30-1~30-3 may become 1 at the same time due to the non-deterministic characteristic of the NFA.

The circuitization of the NFA as shown in FIG. 4 is carried out through a state circuitization step and a state transition circuitization step.

In the state circuitization step, one state of the NFA is replaced by one flip-flop. When the state is effective, an output value of the corresponding flip-flop is 1.

A comparator for comparing a character that is a transition condition (=character given to a branch of the NFA) and a character 22 is placed in the state transition circuitization step. When both characters match, the comparator outputs 1.

A logical AND of the output of the comparator and the output of the flip-flop of a transition source is taken, and the logical AND is used as an input of the flip-flop of a transition destination. Also, when there exists a transition from a plurality of states to one state, a logical OR of the logical ANDs from a plurality of transition sources is taken, and the logical OR is used as an input of the flip-flop of a transition destination.

A pattern matching method using a circuitized NFA has an advantage of providing very fast search speed since a dedicated circuit for searching for desired patterns is configured.

However, the pattern matching method using a circuitized NFA has a problem in which if a plurality of patterns exist, it is difficult to identify patterns that match text.

Hereinafter, this problem will be described in detail.

The most simple pattern identification method is to find the values of pattern detection signals 30-1~30-N outputted by the NFA circuit 10 as shown in FIG. 5 individually. Here, N is the number of patterns.

If the value of a pattern detection signal 30-X (1≤X≤N) is 1, this means that the X-th pattern is detected. In this method, there is a need to provide a circuit for checking all the values of 10000 pattern detection signals 30-1~30-10000, assuming that the number of patterns is 10000. Thus, when the number of patterns is large, the feasibility of this method is low in terms of gate size, wiring capacity, and operation speed.

Consequently, as a more advanced pattern identification method, a conventional method using a priority encoder is disclosed in a paper titled "The design and implementation of a NFA pattern matching circuit for NIDS" by Ono Masato (Graduate School of System and Information Technology, University of Tsukuba) et all, IEIC Technical Report CPSY2004-17 (Institute of Electronics, Information and Communication Engineers).

The priority encoder is a circuit for encoding an input bit string to a numerical value. Generally, input N bits are converted into a numerical value between 0 and (N−1), and the numerical value after encoding is represented by log 2(N) bits.

Even when a plurality of bits in an input bit string becomes 1, each bit is given a priority to determine an output value. If a bit with a high priority is 1, a bit with a priority lower than that is ignored.

If no regular expression is included in the pattern, a bit string of pattern detection signals 30-1~30-N is encoded to a numerical value by using the priority encoder, and the type of the pattern included in the text can be identified by referring to the numerical value after encoding.

For example, when N=8192, the numerical value after encoding is between 0 and 8192 and is represented in 13 bits (log 2(8192)=13).

That is, there is no need to directly refer to 8192 pattern detection signals 30-1~30-8192, so the circuit scale is reduced.

However, in the conventional method using a priority encoder, it is not always possible to identify the type of pattern in a case where a regular expression is included in the pattern.

The reason for this will be described below by using a concrete example.

As described above, when using a priority encoder, a priority should be defined for each input bit. In other words, if a priority cannot be uniquely defined for each bit, the type of pattern included in the text cannot be accurately identified by referring to the numerical value after encoding.

FIG. 6 is a view showing combinations of values of pattern detection signals 30-1~30-3 outputted by the NFA circuit 10 as shown in FIG. 5.

When putting a focus on the columns of pattern detection signal 30-1 and pattern detection signal 30-2 of input table 15 as shown in FIG. 6, there are four combinations of their values: 00, 01, 10, and 11. This means that either one or both of the values of pattern detection signal 30-1 and pattern detection signal 30-2 may be 1.

That is, it can be seen that because pattern detection signal 30-1 and pattern detection signal 30-2 are not in a subordinate relationship, priorities between them cannot be determined.

As explained above, in a pattern matching method using a circuitized NFA, no practical method has been established for identifying a pattern that matches text in a case where a regular expression is included in the pattern.

DISCLOSURE OF THE INVENTION

The present invention has been made taking into consideration the problem of the background art, and it is an object of the present invention to provide a pattern matching device and method which can identify all types of patterns that match text.

To achieve the above object, there is provided a pattern matching device according to the present invention, including: memories for storing both identifiers indicating patterns corresponding to effective patterns of an N number of pattern detection signals and flags indicating the definitions of combinations, individually in addresses set according to the combinations, on each of the combinations of the values of the N number (N: a natural number) of pattern detection signals outputted from a circuited NFA (Non-deterministic Finite Automaton); an address creating unit for determining the address of the memory corresponding to the combination of the values of the pattern detection signals, by using the combination of the values of the pattern detection signals outputted from the circuited NFA; and a read control unit for reading the identifiers and the flags stored in the address continuously while incrementing the addresses determined by the address creating unit, until the flags take a specific value.

In the present invention thus constructed, on each of the combinations of the values of an N number of pattern detection signals outputted from a circuited NFA, both identifiers indicating patterns corresponding to effective patterns of the N number of pattern detection signals and flags indicating the definitions of the combinations of the values of an N number of pattern detection signals, are stored individually in addresses in memories set according to the combinations. Afterward, when the values of the pattern detection signals are outputted from the circuited NFA, the address creating unit determines the address of the memory corresponding to the combination of the values of the pattern detection signals by using the combination, and the read control unit reads the identifiers and the flags stored in the address continuously while incrementing the addresses determined by the address creating unit, until the flags read out from the memory take a specific value.

It is possible to identify the type of pattern that matches text because the present invention includes: memories for storing both identifiers indicating patterns corresponding to effective patterns of an N number of pattern detection signals and flags indicating the definitions of combinations, individually in addresses set according to the combinations, on each of the combinations of the values of the N number of pattern detection signals outputted from a circuited NFA; an address creating unit for determining the address of the memory corresponding to the combination of the values of the pattern detection signals, by using the combination of the values of the pattern detection signals outputted from the circuited NFA; and a read control unit for reading the identifiers and the flags stored in the address continuously while incrementing the addresses determined by the address creating unit, until the flags take a specific value.

DESCRIPTION OF DRAWINGS

FIG. 11 is a view showing a detailed algorithm programmatically representing step S102 of the flowchart of FIG. 8;

FIG. 12 is a view showing a truth value table of the address creating unit as shown in FIG. 7 as being constructed of an input table and an index;

FIG. 13 is a view showing one example of a circuit diagram of the address creating unit satisfying the truth value table as shown in FIG. 12;

BEST MODE FOR CARRYING OUT THE INVENTION

An exemplary embodiment of the present invention is explained hereinafter with reference to the accompanying drawings. In the present invention, data that is a target for pattern matching is called 'text'. Also, text and a pattern are comprised of an array of one or more 'characters'. The characters are not limited to human-recognizable ones, but may be simple numerical values (binary).

Figure 7:
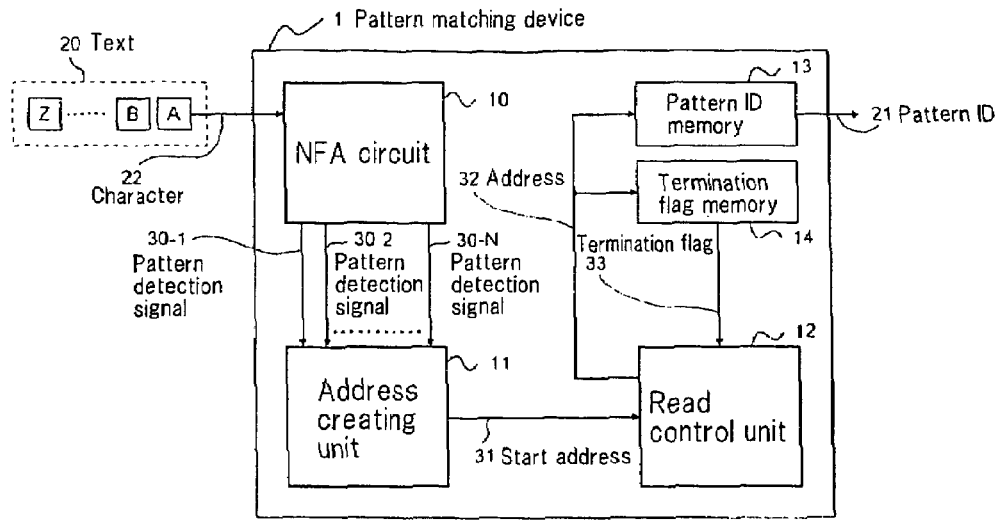
FIG. 7 is a block diagram showing one exemplary embodiment of a pattern matching device according to the present invention.

FIG. 7 is a block diagram showing one exemplary embodiment of a pattern matching device according to the present invention.

Figure 1:
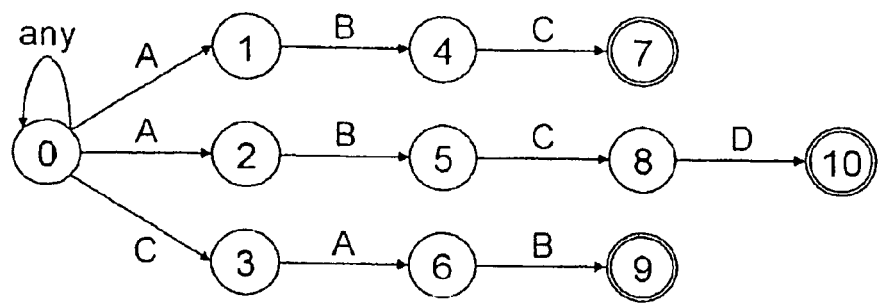
FIG. 1 is a view showing one example of an NFA.
Figure 2:
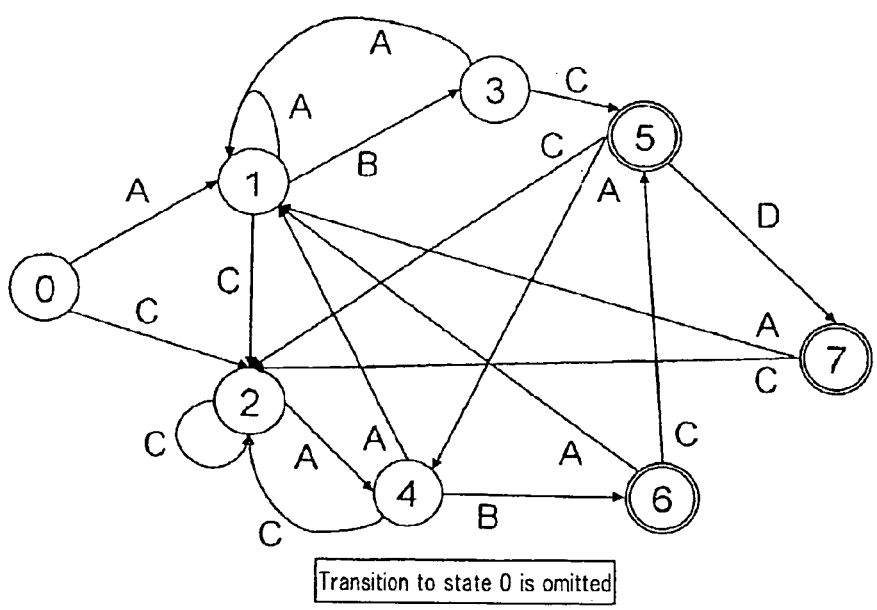
FIG. 2 is a view showing one example of a DFA.

In this exemplary embodiment, pattern matching device 1 comprises, as shown in FIG. 1, NFA circuit 10, address creating unit 11, read control unit 12, pattern ID memory 13, and termination flag memory 14. As well, text 20 is inputted, and whenever a pattern is found on text 20, pattern ID 21, which is an identifier associated with the pattern, is outputted. As for text 20, characters 22, starting from the leading character, are sequentially given one by one to pattern matching device 1.

Figures 5, 6:
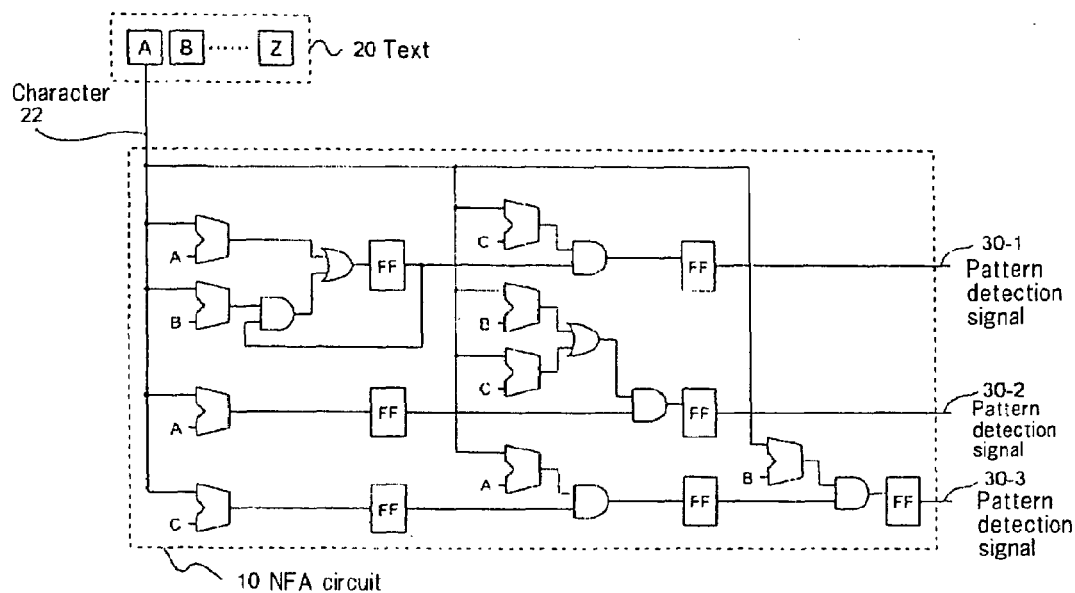
FIG. 5 is a view showing one example of a circuit diagram representing the NFA as shown in FIG. 4 by flip-flops and gates.
FIG. 6 is a view showing combinations of values of pattern detection signals outputted from the NFA circuit as shown in FIG. 5.

NFA circuit 10 is a NFA which is circuitized by using the method described in the background art as shown in FIG. 5.

For example, NFA circuit 10 is one which is circuitized by using the method stated in the paper titled "Fast Regular Expression Matching using FPGAs" by R. Sidhu and V. K. Prasanna, Field-Programmable Custom Computing Machines (FCCM), Rohnert Park, Calif., USA, April 2001. An input of NFA circuit 10 is character 22 which is an element of text 20. NFA circuit 10 sets pattern detection signal 30-X ($1 \leq X \leq N$) to 1 each time it detects an X-th pattern. Meanwhile, other pattern detection signals 30-1~30-N are set to 0. Here, N is the number of patterns and is a natural number. Meanwhile, two or more of pattern detection signals 30-1~30-N may become 1 at the same time due to the non-deterministic characteristic of the NFA.

Address creating unit 11 calculates start address 31 corresponding to a combination of values of pattern detection signals 30-1~30-N. Start address 31 is an address where reading is to begin in pattern ID memory 13 and termination flag memory 14. Address creating unit 11 depends on patterns, and is designed from patterns by a method to be described later.

Read control unit 12 receives start addresses 31 from address creating unit 11, and creates addresses 32 that are to be given to pattern ID memory 13 and termination flag memory 14. Then, addresses 32 are incremented until termination flags 33 read out from termination flag memory 14 become 1. Meanwhile, termination flags 33 are flags indicating the definitions of the combinations of pattern detection signals 30-1~30-N.

Pattern ID memory 13 read the contents of the memory corresponding to addresses 32 and outputs them as pattern IDs 21, under the control of read control unit 12.

Termination flag memory 14 read the contents of the memory corresponding to addresses 32 and outputs them as termination flags 33 under the control of read control unit 12.

The contents of pattern ID memory 13 and termination flag memory 14 are dependent on patterns, and are created from patterns by a method to be described later.

While this exemplary embodiment deals with pattern ID memory 13 and termination flag memory 14 separately, they may be included in the physically same memory.

Hereinafter, a method for designing and determining the above-described NFA circuit 10, address creating unit 11, contents of pattern memory 13, and contents of termination flag memory 14, respectively, from patterns will be described with reference to a flowchart.

Figure 8:
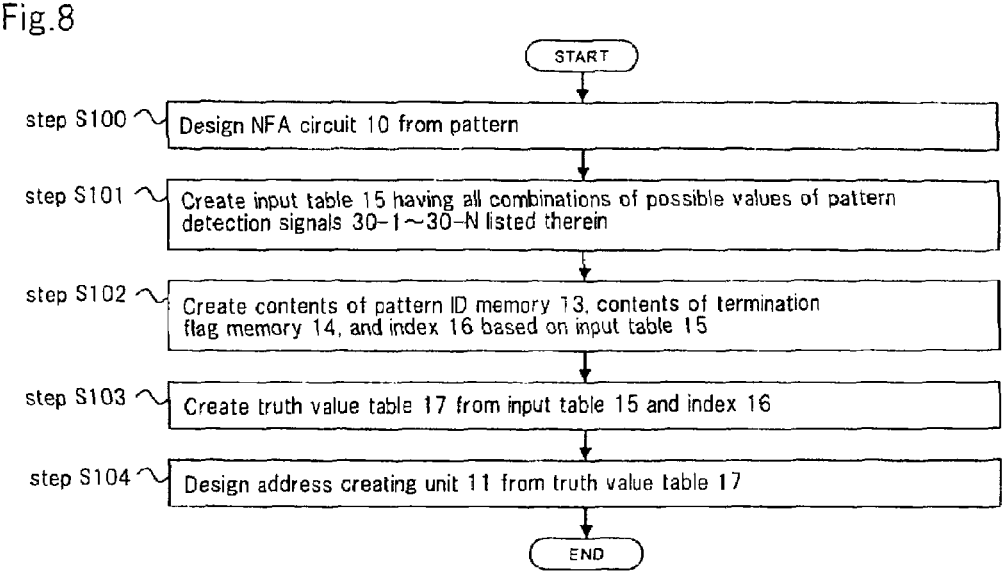
FIG. 8 is a flowchart for explaining a method for obtaining a NFA circuit, an address creating unit, contents of a pattern ID memory, and contents of a termination flag memory as shown in FIG. 7.

FIG. 8 is a flowchart for explaining a method for obtaining NFA circuit 10, address creating unit 11, contents of pattern ID memory 13, and contents of termination flag memory 14 as shown in FIG. 7.

First, in step S100, NFA circuit 10 is designed from a pattern. This design technique is well known and has already been described in the background art.

Next, in step S101, input table 15 having all combinations of possible values of pattern detection signals 30-1~30-N listed therein, is created. Pattern detection signals 30-1~30-N each take a binary value of 0 or 1, so they have up to an N-th power of 2 of combinations.

However, not all of the N-th power of 2 of combinations is practically possible in practice. A combination of possible values of pattern detection signals 30-1~30-N is uniquely determined by a pattern. An appropriate method for obtaining a combination is to convert the NFA obtained in step S100 into a DFA. The NFA can be converted into a DFA by a well-known algorithm, such as subset construction.

Figures 3, 4:
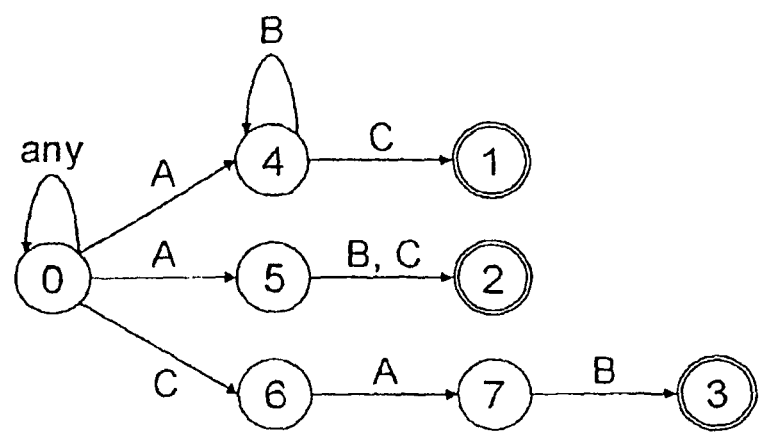
FIG. 3 is a view showing one example of input patterns.
FIG. 4 is a view showing an NFA for accepting the patterns as shown in FIG. 3.
Figure 9:
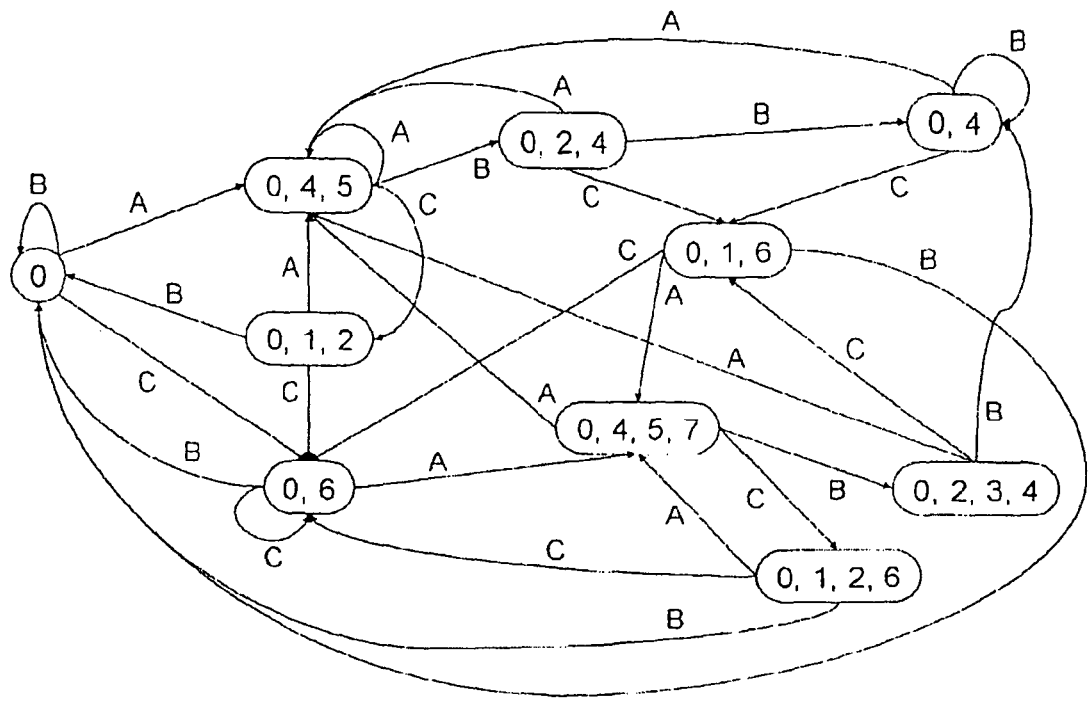
FIG. 9 is a view showing a DFA converted from the NFA as shown in FIG. 4.

FIG. 9 is a view showing a DFA converted from the NFA as shown in FIG. 4.

In FIG. 9, an ellipse represents a DFA state, and one or more numbers included in the ellipse represent the numbers of NFA states, respectively. That is, each DFA state consists of one or more sets of NFA states.

For example, a DFA state {0, 1, 2} of FIG. 9 means that NFA states "0", "1", and "2" are effective at the same time, and the other NFA states are ineffective. Thus, when a transition is made to the DFA state {0, 1, 2}, NFA circuit 10 is subject to the following equations:

value of pattern detection signal 30-1 corresponding to NFA state "1"=1
value of pattern detection signal 30-2 corresponding to NFA state "2"=1
value of pattern detection signal 30-3 corresponding to NFA state "3"=0

That is, each DFA state corresponds to one of the combinations of the values of pattern detection signals 30-1~30-N.

Because of this, all of the combinations of the values of pattern detection signals 30-1~30-N can be acquired by obtaining a DFA.

Input table 15 is a table in which all of the combinations of the values of pattern detection signals 30-1~30-N are arranged in rows. The rows corresponding to pattern detection signals 30-1~30-N whose values are all zero are placed in the first column of input table 15. The second and subsequent rows of input table 15 are placed in random order.

Figure 10:
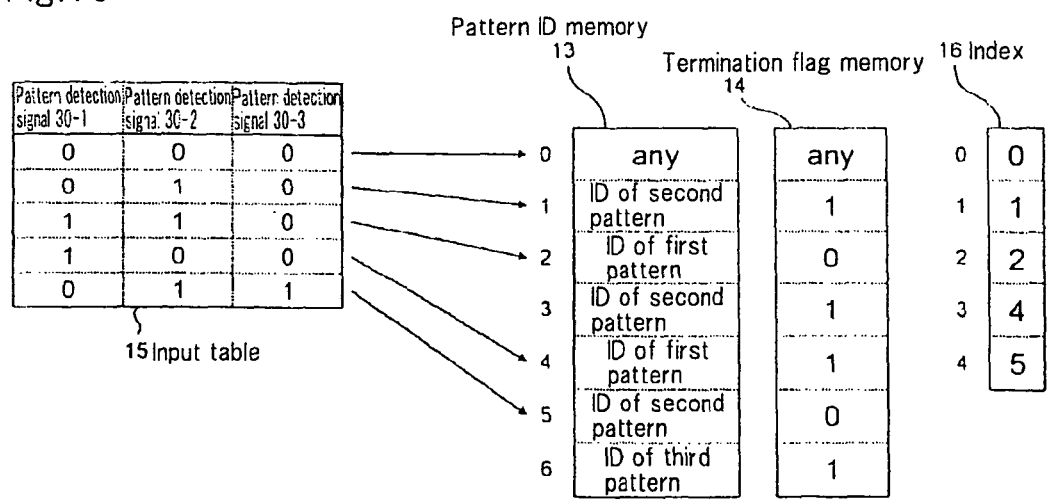
FIG. 10 is a view showing how the contents of the pattern ID memory, termination flag memory, and index as shown in FIG. 7 are created from an input table corresponding to the three patterns as shown in FIG. 3.

FIG. 10 is a view showing how pattern ID memory 13, termination flag memory 14, and contents of an index as shown in FIG. 7 are created from an input table corresponding to the three patterns as shown in FIG. 3.

In step S102, contents of pattern ID memory 13, contents of termination flag memory 14, and index 16 are respectively created based on input table 15.

Index 16 is a temporary one dimensional array created during calculation in the flowchart as shown in FIG. 8, and is not a component of pattern matching device 1. Index 16 has an M-number of cells, and each cell stores the addresses of pattern ID memory 13 and termination flag memory 14. Here, M is the number of rows of input table 15, that is, the number of the combinations of the values of pattern detection signals 30-1~30-N.

FIG. 11 is a view showing a detailed algorithm programmatically representing step S102 of the flowchart of FIG. 8.

The meanings of variables appearing in algorithm A102 are as follows.

index[X]($0 \leq X \leq M$) . . . value of (X+1)-th cell of index 16
input[X][Y]($0 \leq X < M, 0 \leq Y < N$) . . . value of (Y+1)-th cell of (X+1)-th row of input table 15
pattern_id[X]($X \geq 0$) . . . contents of address "X" of pattern ID memory 13
termination_flag[X]($X \geq 0$) . . . contents of address "X" of termination flag memory 14

Algorithm A102 will be expressed in language as follows.

For each row of input table 15, if a value of a cell corresponding to pattern detection signal 30-X ($1 \leq X \leq N$) is 1, the ID of an X-th pattern is added in pattern ID memory 13.

Further, if the cell is the last cell whose value is 1, 1 is added to termination flag memory 14, and if not, 0 is added thereto.

The above process is carried out in order from the first row to the last row of input table 15.

Writing of pattern ID memory 13 and termination flag memory 14 starts from address "1". That is, the contents of address "0" of pattern ID memory 13 and termination flag memory 14 are incertitude.

In addition, in the processing of the X-th row ($1 \leq X \leq N$) of input table 15, when a value is first written in pattern ID memory 13 and termination flag memory 14, the written address is substituted into the X-th cell of index 16.

In this way, as shown in FIG. 10, on each of the combinations of the values of pattern detection signals 30-1~30-N outputted from NFA circuit 10, pattern ID memory 13 and termination flag memory 14 store pattern IDs indicating patterns corresponding to effective ones of pattern detection signals 30-1~30-N and termination flags indicating terminations that define the combinations, individually in addresses set according to the combinations.

Next, in step S103, truth value table 17 is created from input table 15 and index 16. The truth value table in a logic circuit shows input values and their corresponding output values in a table form.

FIG. 12 is a view showing a truth value table of address creating unit 11 as shown in FIG. 7 as being constructed of an input table and an index.

As shown in FIG. 12, the input of truth value table 17 is pattern detection signals 30-1~30-N, and the output thereof is start address 31. Further, combinations of input values of truth value table 17 are input table 15, and their corresponding output values are index 16.

Moreover, a combination of input values not defined in input table 15, that is, a combination of impossible values of pattern detection signals is treated as a redundant input. An output value corresponding to the redundant input is treated as optional (Don't care).

For example, truth value table 17 created from input table 15 and index 16 as shown in FIG. 10 is shown below FIG. 12.

Next, in step S104, address creating unit 11 is designed from truth value table 17. Address creating unit 11 is a logic circuit that satisfies truth value table 17.

FIG. 13 is a view showing one example of a circuit diagram of address creating unit 11 satisfying truth value table 17 as shown in FIG. 12.

Generally, in order to design a logic circuit from a truth value table, a procedure of deriving a logical expression simplified by logically reducing the truth value table is carried out. In particular, since redundant inputs exist in truth value table 17, this makes it easy to obtain a compact logic circuit by logical reduction.

In this way, when determining start address 31 from the combinations of the values of pattern detection signals, the scale of a circuit for determining an address can be made smaller by treating the combination of impossible values of pattern detection signals as a redundant input.

Typical well-known methods of logical reduction include the Karnaugh map, Quine method, and the Quine McCluskey method. These are the basics of digital electronic circuit design and are general knowledge in this field, so description thereof will be omitted.

Hereinafter, an operation of pattern matching device 1 as shown in FIG. 7 will be described in detail by way of concrete example.

In this example, these patterns "AB*C", "A[B|C]", and "CAB" as shown in FIG. 3 are used. Further, it is assumed that text 20 is a character string "ACAB" consisting of four characters. That is, "A", "C", "A", and "B", as characters 22, are sequentially given to pattern matching device 1.

According to the method in the above-described exemplary embodiment, NFA circuit 10 corresponding to these three patterns, address creating unit 11, and contents of pattern ID memory 13 and termination flag memory 14 are created as shown in FIGS. 5, 13, and 10, respectively.

Hereinafter, an operation in which, whenever a pattern is detected among text 20, pattern matching device 1 outputs a pattern ID associated with the pattern, will be described.

Figures 14, 15:
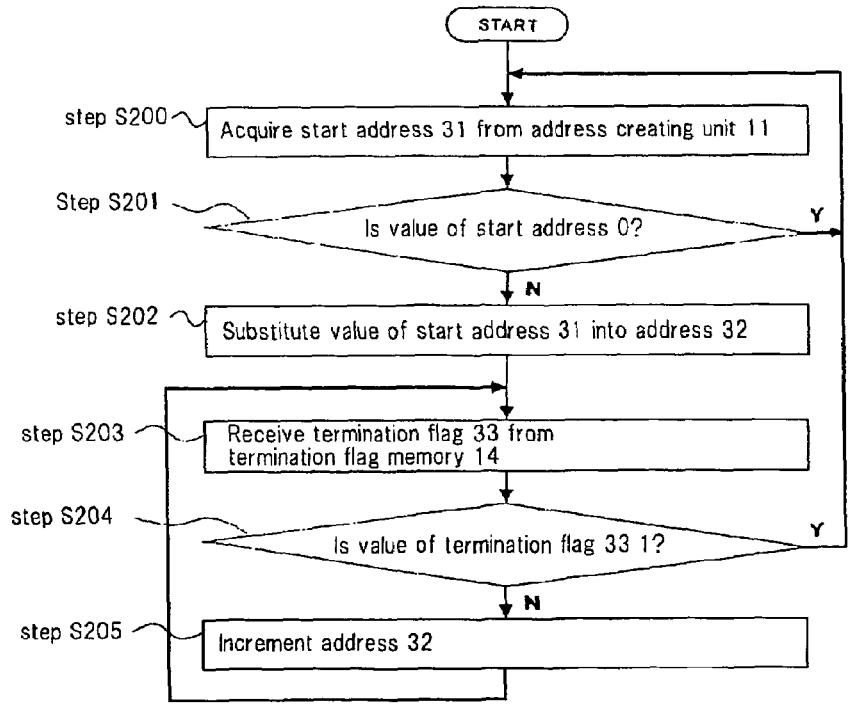
FIG. 14 is one example of a timing chart chronologically showing changes in signals in the pattern matching device as shown in FIG. 7.
FIG. 15 is a flowchart showing an operation of a read control unit as shown in FIG. 7.

FIG. 14 is one example of a timing chart chronologically showing changes in signals in pattern matching device 1 as shown in FIG. 7. In this example, the respective values of pattern detection signals 30-1~30-3, start addresses 31, addresses 32, termination flags 33, and pattern IDs 21 are written in chronological order.

First, a description is given of an operation when the first character "A" of text 20 is inputted into pattern matching device 1.

"A" as character 22 is given to NFA circuit as shown in FIG. 5, NFA circuit 10 outputs pattern detection signals 30-1~30-3, and the values thereof are all zero.

Pattern detection signals 30-1~30-3 are inputted into address creating unit 11, and 0 is outputted as start addresses 32. Start addresses 32 are given to read control unit 12.

Now, an operation of read control unit 12 will be described.

FIG. 15 is a flowchart showing an operation of read control unit 12 as shown in FIG. 7.

First, in step S200, start address 31 is acquired from address creating unit 11.

Next, in step S201, the value of start address 31 is determined to be 0 or not, and if it is 0, then the flow returns to step S200. If it is other than 0, acquired start address 31 is substituted into address 32 in step S202.

Between step S202 and step S203, pattern ID memory 13 and termination flag memory 14 read the contents of the memories corresponding to address 32 and output them as pattern ID 21 and termination flag 33, respectively, under the control of read control unit 12.

In step S203, read control unit 12 receives read termination flag 33.

Thereafter, in step S204, the value of termination flag 33 is determined to be 1 or not, and if it is 1, then the flow returns to step S200. If it is other than 1, the contents of address 32 are incremented by 1 in step S205 and the flow returns to step S203.

The description now returns to the description of the operation of pattern matching device 1.

As described above, when "A", as character 22, is inputted, the value of start address 32 is 0.

At this time, in read control unit 12, the condition of step S201 as shown in FIG. 15 is established and thus the flow immediately returns to step S200, and the process corresponding to the first character of text 20 is finished.

At this point of time, no pattern is detected, and no pattern ID 21 is outputted.

Continuously, a description is given of an operation when "C", which is the second character of text 20, is inputted into pattern matching device 1.

If "C" as character 22 is given to NFA circuit 10 as shown in FIG. 5, the values of pattern detection signals 30-1~30-3 are 1, 1, and 0 in sequence.

At this time, address creating unit 11 outputs 2 as start address 32.

In read control unit 12, because the value of start address 32 is other than 0, the condition of step S201 as shown in FIG. 15 is not established and the flow proceeds to step S202, and the value of start address 31, i.e, 2 is substituted into address 32.

Referring to FIG. 10, the contents of the memory corresponding to address "2" of pattern ID memory 13 is the ID of the first pattern, and hence the ID of the first pattern is outputted as pattern ID 21.

Further, because the contents of the memory corresponding to address "2" of termination flag memory 14 are 0, the value of termination flag 33 is 0. Since the value of termination flag 33 is 0, the condition of step S204 as shown in FIG. 15 is not established and the flow proceeds to step S205, and 1 is added to address 32 to make it 3.

In the same way as previously, referring to FIG. 10, the contents of the memory corresponding to address "3" of pattern ID memory 13 are the ID of the second pattern, and hence the ID of the second pattern is outputted as pattern ID 21.

Further, because the contents of the memory corresponding to address "3" of termination flag memory 14 are 1, the value of termination flag 33 is 1. Since the value of termination flag 33 is not 0, the condition of step S204 is established and the flow returns to step S200, and the process corresponding to the second character of text 20 is finished.

An operation when the third character A and fourth character B of text 20 are inputted into pattern matching device 1 is identical to the above-described operation.

As described above, although the present invention has been described in conjunction with the exemplary embodiment thereof, the present invention is not limited to the above exemplary embodiment. Various modifications that one skilled in the art can understand can be applied to the configuration or details of the present invention without departing from the scope of the present invention.

This application claims a priority based on Japanese Patent Application No. 2007-004458 filed on Jan. 12, 2007, the entire contents of which are incorporated herein by reference.

The invention claimed is:

1. A pattern matching device for identifying a pattern, comprising:
    a first memory that stores an identifier corresponding to an address which is set according to each combination of values of pattern detection signals, wherein the identifier indicates the pattern of an effective pattern detection signal which is included in the pattern detection signals;
    a second memory that stores a flag corresponding to the address, wherein the flag indicates a definition of each of the combinations;
    an address creating unit that determines a start address based on a combination of values of pattern detection signals outputted from a circuited NFA (Non-deterministic Finite Automaton); and
    a read control unit that reads the identifier from the first memory and the flag from a second memory corresponding to the start address and increments the start address, wherein the read control unit continues to read the identifier and the flag, and to increment the start address until the flag takes a specific value.

2. The pattern matching device of claim 1, wherein the address creating unit treats a combination of impossible values of the pattern detection signals as redundant input, when the address creating unit determines the start address.

3. A pattern matching method for identifying a pattern, comprising:
    storing in a first memory an identifier corresponding to an address which is set according to each combination of values of pattern detection signals, wherein the identifier indicates the pattern of an effective pattern detection signal which is included in the pattern detection signals;
    storing in a second memory a flag corresponding to the address, wherein the flag indicates a definition of each of the combinations;
    determining a start address based on a combination of values of pattern detection signals outputted from a circuited NFA (Non-deterministic Finite Automaton); and
    reading the identifier from the first memory and the flag from the second memory corresponding to the start address and incrementing the start address, and continuing to read the identifier and the flag, and to increment the start address until the flag takes a specific value.

4. The pattern matching method of claim 3, wherein a combination of impossible values of the pattern detection signals is treated as redundant input, when determining the start address.

* * * * *